United States Patent [19]

Roussel et al.

[11] Patent Number: 6,107,412
[45] Date of Patent: Aug. 22, 2000

[54] PROCESS FOR PREPARING POWDERY IONOMERS AND THEIR USE AS PROTECTIVE COATING FOR GROUND AND WALL-COVERING PRODUCTS

[75] Inventors: Albert Roussel, Wiltz, Luxembourg; Alexandre Siche, Saint-Christol, France

[73] Assignee: Tarkett Sommer S.A., Nanterre, France

[21] Appl. No.: 09/029,475

[22] PCT Filed: Aug. 28, 1996

[86] PCT No.: PCT/BE96/00091

§ 371 Date: Jul. 9, 1998

§ 102(e) Date: Jul. 9, 1998

[87] PCT Pub. No.: WO97/09358

PCT Pub. Date: Mar. 13, 1997

[30] Foreign Application Priority Data

Sep. 1, 1995 [EP] European Pat. Off. .............. 95870101

[51] Int. Cl.[7] .............................. C08F 8/00; C08J 57/02; B32B 5/16
[52] U.S. Cl. ........................ 525/326.1; 524/500; 428/402
[58] Field of Search ........................... 525/326; 524/500; 428/402

[56] References Cited

U.S. PATENT DOCUMENTS

| 3,665,060 | 5/1972 | Bergomi, Jr. et al. .................. 525/201 |
| 3,755,219 | 8/1973 | Bergomi, Jr. et al. ...................... 260/8 |
| 3,933,954 | 1/1976 | Gebhard, Jr. et al. ...................... 264/8 |
| 4,056,653 | 11/1977 | Gebhard, Jr. et al. .................. 428/402 |
| 4,220,573 | 9/1980 | Bock et al. .............................. 524/576 |
| 4,329,304 | 5/1982 | McClain ...................................... 264/8 |
| 4,336,210 | 6/1982 | McClain ...................................... 264/8 |
| 4,440,908 | 4/1984 | McClain ................................. 525/196 |
| 5,387,635 | 2/1995 | Rowland et al. ....................... 524/379 |
| 5,412,023 | 5/1995 | Hille et al. .............................. 524/539 |

FOREIGN PATENT DOCUMENTS

WO 95/11333  4/1995  WIPO .

*Primary Examiner*—David W. Wu
*Assistant Examiner*—Tanya Zalukaena
*Attorney, Agent, or Firm*—Alix, Yale & Ristas, LLP

[57] ABSTRACT

The invention concerns a process for preparing powdery ionomers by neutralizing a powdery precursor using a neutralizing agent. A particular feature of the invention is that the precursor is used in a powder form and a concentrated aqueous solution of neutralizing agent is rapidly mixed with the precursor, and that the neutralized ionomer essentially retains the dry powder form and size of a precursor while having a water content of about 10%. The resulting product can be used as a wear layer for producing ground and wall coverings, either by powder deposition process or by extension to form a film, which is applied in a hot state to a support.

6 Claims, 1 Drawing Sheet

PROCESS FOR PREPARING POWDERY IONOMERS AND THEIR USE AS PROTECTIVE COATING FOR GROUND AND WALL-COVERING PRODUCTS

CROSS-REFERENCE TO RELATED APPLICATIONS

This is the national stage of International Application No. PCT/BE96/00091 filed Aug. 28, 1996.

SUBJECT OF THE INVENTION

The present invention relates to a process for the preparation of ionomers in powder form.

The invention covers the use of ionomers in powder form obtained by this process for the protection of floor coverings or wall coverings.

TECHNOLOGICAL BACKGROUND

Floor coverings or wall covering are made essentially based on vinyl chloride homopolymers or copolymers. In addition to its physical and mechanical properties, the use of PVC is advantageous on account of its ease and diversity of use, especially by:

calendering or extrusion for the manufacture of sheets, coating with plastisol.

The inclusion of a swelling agent in the formulations allows foams to be obtained. These can be inhibited by localized printing to obtain relief effects.

However, for reasons associated with environmental protection, studies are currently under way in an attempt to replace PVC by polymers containing neither chlorine nor nitrogen.

Patents DE-3,903,670 C1 and DE-3,903,669 C1 describe the manufacture of floor coverings or wall coverings from PMMA, which is plasticized, by calendering or coating with plastisols.

These products contain a high level of plasticizers and can thus have drawbacks resulting from their migration and their volatility. Furthermore, acrylic compounds are relatively expensive polymers.

Patent application BE-09300955 describes the manufacture of a floor covering on EVA foam by calendering or extrusion and coated with a sheet of a so-called ionomeric compound, extruded as a wear layer. As a result of its excellent properties (transparency, resistance to abrasion, to scratching and to marking), this type of wear layer is considered to be particularly advantageous.

The manufacture of ionomers is itself described in the document "Ionic Polymers", Encyclopedia of Polymer Science and Engineering, Wiley-Interscience, Volume 8 (1987), pp. 393–423.

An ionomer is generally produced in two steps: the manufacture of a precursor, followed by its neutralization with a metal salt.

In order to obtain the precursor, ionic polymers are usually prepared by copolymerization of a functionalized monomer and of an olefinic monomer or by direct functionalization of a pre-existing polymer. Typically, the presence of a carboxyl group is obtained by copolymerization of acrylic acid or methacrylic acid with ethylene, styrene or other monomers. The resulting copolymer contains free acid functions which can be neutralized to the desired degree with metal hydroxides, metal acetates or salts.

The second step consists in neutralizing the said groups. Several routes can be used.

In the reaction in solution, this involves dissolving the copolymer, neutralizing in solution, precipitating it, washing it and finally drying it. The ionomer obtained is then stored with a desiccant to avoid any uptake of moisture.

This method of production is described in the literature, for example: "Ionomers: the sodium salt of Poly(ethylene-co-Methacrylic Acid)", Keling Han and H. Leverne Williams, Journal of Applied Polymer Science, Vol. 38, pp. 73–86 (1989), and U.S. Pat. No. 5,003,012.

The reaction for extrusion-neutralization is carried out in the extrusion die during melting of the products. The temperatures reached in the die are from about 180° C. to 260° C., and sometimes even higher. The sources of cations which can be used are especially $Na_2CO_3$, $K_2CO_3$, $Mg(OH)_2$, ZnO and $Cu(CH_3COO)_2$.

During this reaction, volatile products are eliminated in a degassing chamber on the die. This degassing step is very intricate since, with ionomer precursors with a high fluidity index, it is the product which escapes. This technique thus limits the manufacture of ionomer from precursors having an excessively high melt index.

Furthermore, this technique gives rise to contact between melting material and metal surfaces. On account of their chemical composition (presence of acidic sites), these products are corrosive, and it is necessary to work with metal surfaces which have undergone an anticorrosion treatment. If this is not the case, the ionomer causes abrasion of the apparatus for the conversions, by corrosion. In this technique, it is also necessary to limit the moisture, since the synergism between acid, water and high temperature promotes corrosion.

This production technique is described in patent EP-0,537,487 A1.

It is possible to neutralize a precursor film by immersion, by submerging it in a neutralizing solution for a certain period. The degree of neutralization is then adjusted by the residence time in the solution. This technique is itself also followed by a drying period in order to remove any moisture.

An illustration of this technique is given in the publication "Dynamic Mechanical Studies of Partially Ionized and Neutralized Nafion Polymers", Thein Kyu, Mitsuaki Hashiyama and Adi Eisenerg. Can. J. Chem. 61, 680 (1983).

These various techniques, and especially the second, make it possible to obtain ionomeric films. Their good behavior with regard to resistance to abrasion, to scratching and to marking, as well as their transparency, allow them to be used as wear layers in floor coverings. However, adhesion difficulties are observed with the sub-layers or the support, and especially problems of bonding to the metal parts of the complexing tools. On account of their chemical composition, working these films with hot tools (cylinder) results in bonding. The term "hot tack" is used in this case. As regards, the adhesion problems, the solutions envisaged to date are mainly the application of such films using agents of the "hot-melt" type or coating with adhesives. These solutions are the subject of the published patent applications WO 95/11333 and WO 95/08593.

One solution for circumventing the implementation drawbacks, and mainly the "hot tack" drawback, is the use of ionomers in the form of ionomeric powders. This choice would make it possible to avoid the problems of bonding on a cylinder while at the same time obtaining the fusion of a transparent film as a wear layer. However, on account of its chemical composition (presence of ionic bonding), an ionomer has a much higher cohesion energy than the precursor (hydrogen bonding), which makes it very difficult to grind.

Cryogenic grinding is thus necessary, but this technique is very expensive and remains very intricate on account of the cold-temperature behavior of the ionomers. Furthermore, the use of powders obtained by these techniques does not consist merely of advantages, since the risks of explosion increase as the fineness of the powder increases. The reason for this is that electrical charges accumulate and the risks of sparks are thus increased. Precautions must consequently be envisaged.

It has already been proposed to produce ionomeric resins by the technique of mixing two dry powders.

In document DATABASE WPI, Section Ch, Week 8651; Derwent Publications Ltd., London, GB; Class A18, AN 86-336142 and JP-A-61 252 204 (MITSUBISHI PETROCH KK), Nov. 10, 1986, it is proposed to prepare a homogeneous dispersion of alpha-olefinic copolymers containing $\alpha,\beta$-unsaturated carboxylic acids and at least one crosslinking agent in powder form chosen from the hydroxides of metals from groups IIa and IIb, followed by blending in the molten state. This technique avoids the use of blenders treated against corrosion.

In document U.S. Pat. No. 4,638,034, ethylene/acrylic acid copolymers or salts thereof are saponified in the molten state in the absence of solvents or water, other than the alkanol by-product. It is also sought to avoid corrosion of the plants.

In document U.S. Pat. No. 5,036,134 an ionomeric precursor of the styrene/acrylate type and an organozinc salt are dry-ground and then mixed in the molten state in a Brabender mixer, cooled with water. The product is used as a binder in paints.

Lastly, document U.S. Pat. No. 3,755,219 proposes to mix, by vigorous stirring, an essentially dry heteropolymer of styrene/maleic anhydride, methyl maleate with a sodium hydroxide solution.

According to a variant, a dry styrene/maleic anhydride copolymer is mixed vigorously and neutralized with ammonia gas.

The interpolymers obtained are used as binders for pigments or adhesives or for coating paper, cardboard or similar materials with pigments, in conjunction with starches or protein materials for coating paper.

AIMS OF THE PRESENT INVENTION

The invention is aimed at providing a process for obtaining ionomers which makes it possible to overcome or reduce the problems inherent in the proposals of the prior art, in particular:
  hot-bonding to metal surfaces,
  corrosion of the tools for the transformation,
  degassing,
  grinding,
  safety,
  limited choice of precursor, with regard to the acceptable melt index values.

In addition, the invention is aimed at a process for readily modifying the characteristics of the film obtained as a function of the requirements of the finished product.

CHARACTERISTIC FEATURES OF THE INVENTION

Figure 1:
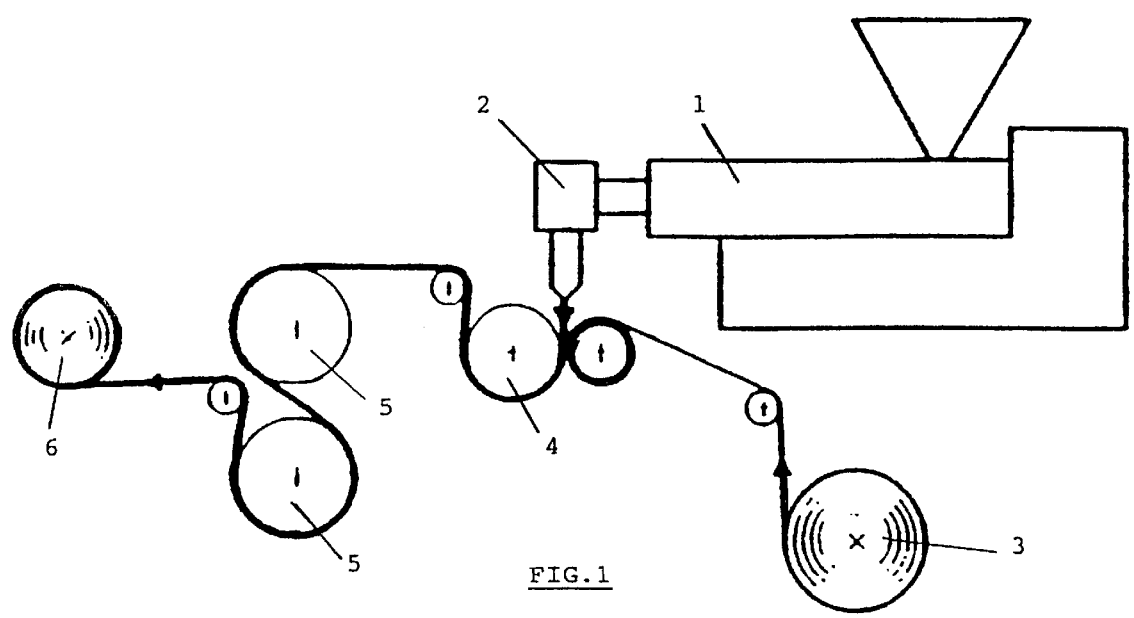
FIG. 1 schematically represents an extrusion-layering technique for using the ionomers of the invention in order to produce floor coverings.

The present invention is aimed at developing a novel process for the manufacture of ionomers in powder form, these types of ionomers being particularly suitable for use in the wear layer of floor coverings and wall coverings.

The invention relates to a process for the preparation of ionomers in powder form which includes the neutralization of a precursor in powder form by a neutralizing agent, characterized in that the neutralization is carried out by adding a defined, measured amount of solution of neutralizing agent in a rapid mixer, essentially conserving the dry-powder nature.

The essential advantage of this technique is the fact that the powdered starting material is the precursor whose properties, especially the particle-size properties, can be controlled fairly easily, whereas, for the reasons mentioned, the actual ionomer itself can only allow this control with great difficulty.

Preferably, the neutralizing solution is at concentrations close to saturation. After mixing for a few minutes, the powdered neutralized ionomer precursor regains its initial characteristics (particle size, flow, etc.) although it can contain a certain amount of water (about 10%).

Powder treated by this technique remains in dry form, thereby making it possible to use directly the distribution techniques specific for powders for the production of a film.

The solubility of the neutralizing agents will limit the degree of neutralization. However, this solubility can be increased by varying the pH of the solvent medium, which is generally water.

The technique described offers a wide latitude as regards:
  the neutralizing agents (base),
  the precursors,
  the transformation techniques,
  the degree of neutralization,
  the performance of the product.

This technique also offers advantages associated with safety by reducing the risk of explosion and above all controlling the degree of neutralization.

The neutralizing solutions used are obtained by dissolving a salt or, preferably, a base or a metal oxide. Suitable bases must be strong enough to allow the neutralization of the acidic sites in the precursor. A wide choice of bases is involved in this case, such as: NaOH, KOH, $Ca(OH)_2$, $Mg(OH)_2$, $Zn(OH)_2$. Metal oxides such as ZnO, MgO, CaO, $K_2O$, silicates such as $Na_2SiO_3$, etc., carbonates such as $Na_2CO_3$, $CaCO_3$, borates, phosphates, etc. are also suitable. The degree of neutralization will depend on the solubility of the bases used. Furthermore, it is possible to carry out mixing with these bases so as to obtain a neutralized ionomer with several metal cations. This neutralization technique therefore offers great neutralization versatility with regard to the choice of metal cations.

The particle size of the precursor powders is usually less than 450 $\mu$m with an average diameter of 170 $\mu$m. After neutralization, the particle size is still less than 450 $\mu$m but the average diameter is 150 $\mu$m. This decrease is probably due to the lowering of the electrostatic phenomena. The neutralized product has no tendency to agglomerate. A finer particle size allows the manufacture of a thinner film and facilitates the neutralization on account of the increase in the reaction surface area.

One operating condition of the invention is the fact that the neutralization is carried out on a precursor which is in powdered form. Many precursors exist in powdered form or are grindable. However, at no time is the invention bound by limiting physical or chemical characteristics present in the known techniques, especially the viscosity, which is a limiting factor in the case of extrusion reactions.

In the known technique, the nature of the acid and the acid content constituted a limiting factor. This is because the presence of acidic sites is an inconvenience on account of the bonding to the machine and the corrosion it induces during reaction in an extruder. The neutralization technique of the invention makes it possible to avoid these drawbacks and allows the use of a precursor without any limitation on the acid content or on the nature of the acid.

The use of ionomers in the form of a powder makes it possible to avoid any contact with a hot metal surface during distribution and transformation, and thus to avoid any risk of bonding which is inherent in the chemical composition of the products. Furthermore, the neutralization technique according to the invention, which uses an aqueous solution of a strong base, provides a non-negligible amount (about 10%) of water, which, instead of being a disruptive component, turns out to be a favorable component. The water allows the distribution to be improved by reducing the electrostatic phenomena. It also acts as a fluidizing component (improvement of the film-formation). Furthermore, in terms of safety, the water allows the risks of explosion to be reduced by lowering the accumulation of electrical charges, but also by diluting the oxygen and absorbing heat.

The use of the neutralization technique recommended according to the invention offers wide scope with respect to the degrees of neutralization. This makes it possible to dispense with existing grades of ionomers in which the degree of neutralization of the product sold is predetermined by the manufacturer. It is thus possible to conserve a wider scope and relative independence in the choice of ionomers.

Another advantage of the technique according to the invention is the possibility of carrying out neutralizations with several metal cations. It is possible to produce an ionomer neutralized with several types of cations in order to combine their effects.

The technique thus makes it possible to obtain ionomers with different degrees of neutralization with very varied types of cation, optionally as a mixture as indicated above.

It is also possible to incorporate, in this way, additives formed in situ, by selecting the anion of the neutralizing agent, for example silica formed from silicate, such as sodium silicate.

Since the performance of ionomeric films are linked to the degree of neutralization and to the nature of the neutralizing agent, it is possible to manufacture films whose behavior is adjusted as a function of their use. The technique according to the invention is thus especially indicated to allow the best possible compromise between the desired performance and the performance obtained.

The ionomer in powdered form obtained according to the invention can be deposited on a suitable polymer support by known techniques for depositing powders, and can be melted, preferably without metal contact, in particular by IR radiation, to form a film, preferably a transparent film, which serves as a wear layer or as a protective layer for the said polymer support in order to obtain a floor covering or a wall covering.

The ionomer in powder form can also be converted by standard extrusion techniques after neutralization in order to form a film, preferably a transparent film, which serves as a wear layer or as a protective layer for a polymer support in order to obtain a floor covering or a wall covering. The advantage of this technique lies in the fact that excellent adhesion of the film resulting from the extrusion to the polymer support is obtained if the support is heated to the same temperature or to a temperature close to that of the ionomeric film when this film leaves the extruder.

An additional advantage lies in the fact that it is possible in this way to prepare a very thin, protective ionomeric film, for example one of about a few $\mu$m.

In the two cases mentioned above (deposition as a powder or extrusion-layering) on a polymer support, the ionomer can be used directly without any need for predrying or prefiltration, in contrast with the techniques for producing ionomers according to the prior art.

Furthermore, contrary to what might have been expected given the difficulties of using conventional ionomers by extrusion, it is observed that the type of ionomers according to the invention behave very well, i.e. without the usual difficulties associated with overheating, viscosity, degassing or corrosion. Standard extruders for the production of floor coverings or wall coverings can thus be used.

The technical aspects of using the ionomer do not differ substantially from the known techniques for the preparation of "dry-blends" or "dry-mixes" of flexible PVC.

The aim of the blending is to obtain a blend in the form of a dry powder (dry-mix).

The "dry-mixes" can be prepared in twin-tank mixers (Henschel®, Papenmeier®, M.T.I.®, etc.). The upper tank is jacketed.

In the case of PVC, the jacketed tank is set up to allow heating. In the case of the ionomers, heating of the tank is not usually necessary, since, in general, the powders generally used have relatively low melting points (80–90° C.) and heating would run the risk of bringing about agglomeration; the jacket can, however, serve to cool or control the blending temperature and to avoid excessive frictional heating.

The blend is transferred mechanically into a second tank (lower tank). This second blending tank, which is also jacketed, is cooled. It generally has four times the capacity of the first tank, so as to allow rapid cooling of the material, if necessary.

These blenders work at high speed (3000 rev/min), on a short cycle (10 to 15 min). They have blend capacities ranging from 50 to 500 kg of blend.

For larger capacities (unit loads of 2000 kg, for example), slow-heating blenders are used. The ones most often used are horizontal mixers, the mixing tools consisting of paddles or screws with a helical ribbon (ribbon blender type).

The ionomeric powders can be converted by various techniques of extrusion, extrusion-layering and other extrusion processes. Various known items of equipment are suitable in this respect.

Mention may be made of twin-screw extruders, usually recommended for extruding PVC dry-mixes (cylindrical screws or conical screws) with temperature regulation, and multi-screw extruders.

The extrusion-layering technique, also known as extrusion-lamination, described with reference to FIG. 1, is based on the extrusion of the ionomeric powders on an extruder 1 fed with ionomeric powder produced according to the invention and equipped with a flat die 2, 1.5 to 2 meters in length, and fixed onto the extruder head, in prolongation of the axis of the extruder (rather than perpendicular to it) so as to allow the support 3 to run under the die. This support is advantageously preheated to the temperature of the film as it leaves the extruder head.

The ionomeric film and the support are attached together solidly under pressure in a rolling mill 4. The film is calibrated both at the flat die 2 and at the rolling mill 4. However, the final thickness of the film is determined by the draw rate of the rolling mill. The ribbon is cooled immediately and then wound onto a reel at position 6.

A standard decorated support optionally having a relief, such as those used for covering floors and/or walls, can thus receive a coating of ionomer prepared according to the technique proposed by the invention.

The invention will be described in greater detail with reference to preferred embodiments given by way of example with no limiting nature.

EXAMPLE 1

Dry-blend Neutralization

A neutralizing solution close to saturation is added gradually to a precursor powder in a Prodex-type rapid mixer.

At the end of the addition, the mixture is blended until a powder of dry appearance is obtained (between 5 and 30 minutes). This powder is then coated onto release paper, pregelled and melted in an Isotex oven at 190° C. for 3 minutes.

The tables which follow show that variation of the concentration and type of base in the neutralizing solutions makes it possible to modify the degrees of neutralization and to incorporate different types of cations.

TABLE 1

Influence of the concentration.

| Volume of H$_2$O | 0 | 100 cc | 90 cc | 110 cc |
|---|---|---|---|---|
| Mass of NaOH | 0 | 36 g | 36 g | 36 g |
| Mass of powder | 1000 g | 1000 g | 1000 g | 1000 g |
| T° crystallization | 57 ± 2 | 40° C. | 40° C. | 40° C. |

TABLE 2

Variation of the neutralization.

| Volume of H$_2$O | 0 | 100 cc | 100 cc | 100 cc |
|---|---|---|---|---|
| Mass of NaOH | 0 | 18 g | 26 g | 36 g |
| Mass of powder | 1000 g | 1000 g | 1000 g | 1000 g |
| T° crystallization | 57.76° C. | 49.68° C. | 44.19° C. | 40° C. |

TABLE 3

Na and Zn neutralization.

| Volume of H$_2$O | 100 cc | 100 cc | 100 cc | 100 cc |
|---|---|---|---|---|
| Mass of NaOH | 36 g | 36 g | 29 g | 29 g |
| Mass of ZnO | 2 g | 4 g | 2 g | 4 g |
| Mass of powder | 1000 g | 1000 g | 1000 g | 1000 g |
| T° crystallization | 41° C. | 40° C. | 45° C. | 40° C. |

TABLE 4

Neutralization of another precursor.
Escomer M504 from Exxon

| Volume of H$_2$O | 0 | 35 cc | 58 cc |
|---|---|---|---|
| Mass of NaOH | 0 | 12.5 g | 21 g |
| Mass of powder M 504 | 1000 g | 1000 g | 1000 g |
| T° crystallization | 53.90° C. | 51.17° C. | 39.28° C. |

TABLE 5

Neutralization with sodium silicate

| Volume of water (ml) | — | 60 | — |
|---|---|---|---|
| Mass of NaOH (g) | — | 26 | — |
| Mass of silicate (g)* | — | — | 157 |
| Mass of powder (g) | 1000 | 1000 | 1000 |
| T° crystallization (° C.) | 63.04 | 54.19 | 55.27 |

(*)Sodium silicate: 27% SiO$_2$ in 14% NaOH

EXAMPLE 2

Conversion of the Powder by Melting 1 kg of Escomer A 404 (Exxon) is neutralized using a solution of 26 g of sodium hydroxide in 60 ml of water, according to the process described in Example 1.

The white powder obtained is a 30% neutralized sodium ionomer. This powder is sieved and mixed with 0.5% of Neosyl TS (Crosfield). It is then coated, using a scraper, onto a calendered film based on EVA resins whose composition is formulated as follows:

EVA: 350 chalk: 250 pigment: 14 lubricant; 13

The deposit is agglomerated slightly by passing it under IR lamps and it is melted in a pulsed hot-air oven (Isotex) at 190° C. for 3 minutes.

The table gives the weight and the thickness of the wear layer obtained as a function of the aperture of the scraper and the particle size.

The film is transparent; it has no defects when the weight deposited is:

>250 g for a powder sieved to 250 µg

>250 g for a powder sieved to 315 µg

>230 g for a powder sieved to 450 µg

TABLE 6

Weight and thickness of film as a function of the particle size

| | Powder sieved < | | | | | |
|---|---|---|---|---|---|---|
| | 250µ | | 315µ | | 450µ | |
| Scraper aperture (mm) | weight (g/m$^2$) | thickness (mm) | weight (g/m$^2$) | thickness (mm) | weight (g/m$^2$) | thickness (mm) |
| 0.4 | 92 | — | — | — | — | — |
| 0.5 | 197 | 0.17 | 182 | 0.16 | — | — |
| 0.6 | 187 | 0.17 | 154 | 0.17 | 168 | 0.15 |
| 0.7 | 221 | 0.20 | 233 | 0.20 | 232 | 0.19 |
| 0.8 | 280 | 0.25 | 270 | 0.25 | 276 | 0.25 |
| 0.9 | — | — | 274 | 0.28 | 267 | 0.28 |
| 1.0 | — | — | — | — | 320 | 0.32 |

EXAMPLE 3

Extrusion of the Ionomer 20 kg of Escomer M 5404 (Exxon) are neutralized using a solution of 1070.5 g of sodium hydroxide in 3 liters of water, according to the process described in Example 1.

The white powder obtained is a 75% neutralized sodium ionomer.

This powder is introduced into the feed hopper of a Mapre twin-screw extruder fitted with a flat die whose orifice land is adjusted to 0.3 mm.

The screw spin speed is 70 rev/min. The material is extruded while degassing under the following temperature conditions:

screw temperature: 120° C.

collar temperature: 180° C.

body temperature: zone 1: 185° C.

zone 2: 210° C.

zone 3: 220° C.

zone 4: 215° C.

zone 5: 200° C.

die temperature: zones 1 to 5: 215–220° C.

On leaving the die, the film is cooled on a cylinder and wound into a reel. The film obtained has a thickness of 0.2 mm and is entirely transparent.

Despite the high content of water in the powder, the film has no bubbles.

What is claimed is:

1. Process for the preparation of ionomers in a powder form comprising the steps of providing an unneutralized, carboxylic acid group containing ionomer precursor in powder form and rapidly mixing with the ionomer precursor a concentrated aqueous solution of a neutralizing agent at concentrations close to saturation while essentially retaining the dry-powder form and size of the precursor to provide a neutralized powder having a water content of about 10%, which acts as a fluidizing component and reduces the risks of explosion.

2. Process according to claim 1, characterized in that the neutralizing solutions used are obtained by dissolving a neutralizing agent selected from the group consisting of a salt, a base and a metal oxide.

3. The process of claim 1 including the step of depositing the neutralized powder on a support in the form of a thin layer for adhesion to the support.

4. The process of claim 3 wherein the layer of deposited powder is melted to form a thin layer.

5. The process of claim 3 wherein the deposited powder is melted by infrared radiation.

6. The process of claim 1 including the step of depositing the neutralized powder on a support as a hot extruded film for adhesion to the support.

* * * * *